United States Patent
Böhm

(10) Patent No.: US 9,566,962 B2
(45) Date of Patent: Feb. 14, 2017

(54) METHOD FOR CONTROLLING A BRAKING SYSTEM FOR MOTOR VEHICLES

(71) Applicant: Continental Teves AG & Co. oHG, Frankfurt (DE)

(72) Inventor: Jürgen Böhm, Oberneisen (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 21 days.

(21) Appl. No.: 14/431,151

(22) PCT Filed: Sep. 9, 2013

(86) PCT No.: PCT/EP2013/068577
§ 371 (c)(1),
(2) Date: Mar. 25, 2015

(87) PCT Pub. No.: WO2014/048705
PCT Pub. Date: Apr. 3, 2014

(65) Prior Publication Data
US 2015/0239438 A1    Aug. 27, 2015

(30) Foreign Application Priority Data

Sep. 28, 2012 (DE) .......... 10 2012 217 752
Aug. 14, 2013 (DE) .......... 10 2013 216 157

(51) Int. Cl.
*G06F 7/70* (2006.01)
*G06F 19/00* (2011.01)
(Continued)

(52) U.S. Cl.
CPC ............. *B60T 8/172* (2013.01); *B60T 7/042* (2013.01); *B60T 8/326* (2013.01); *B60T 13/662* (2013.01);
(Continued)

(58) Field of Classification Search
CPC ........ B60T 8/172; B60T 7/042; B60T 13/686; B60T 8/326; B60T 2270/82; B60T 2270/14; B60T 13/662
(Continued)

(56) References Cited

U.S. PATENT DOCUMENTS 5,163,742 A * 11/1992 Topfer .............. B60T 8/1708
                                                  303/155
6,249,736 B1 * 6/2001 Schmidt ............... B60T 7/12
                                                 303/115.2
(Continued)

FOREIGN PATENT DOCUMENTS

DE    10 2011 076 675 A1    12/2011
DE    10 2012 200 494 A1     8/2012
(Continued)

OTHER PUBLICATIONS

PCT International Search Report—10/12/2-13.
German Examination Report—Feb. 5, 2014.

*Primary Examiner* — Jaime Figueroa
(74) *Attorney, Agent, or Firm* — Brinks Gilson & Lione

(57) ABSTRACT

A method for controlling a braking system for motor vehicles having a hydraulically actuatable wheel brake which can be actuated by an electronically controllable pressure supply device having a cylinderpiston arrangement with a hydraulic pressure chamber, the piston of which can be displaced by an electromechanical actuator such that a pre-defined desired pressure value can be adjusted, a position of the pressure supply device being detected, and an actual pressure ($P_{v,\,act}$) of the pressure supply device being determined by a measurement device. To allow braking pressure to build dynamically at low or medium desired pressure values, manipulated variables ($\omega_{act,soll}, M_{act,soll}$) are formed for the electromechanical actuator (1) on the basis of the pre-defined desired pressure value and of an actual pressure value ($P_{V,Dach}$), determined on the basis of the desired pressure value ($P_{v,soll}$) by weighted addition of the actual pressure ($P_{v,act}$) and of a model pressure ($P_{v,Mod}$) calculated from a current position ($X_{act}$) of the pressure supply device.

12 Claims, 5 Drawing Sheets

(51) Int. Cl.
  *G06G 7/00* (2006.01)
  *G06G 7/76* (2006.01)
  *B60T 8/172* (2006.01)
  *B60T 8/32* (2006.01)
  *B60T 13/66* (2006.01)
  *B60T 13/68* (2006.01)
  *B60T 7/04* (2006.01)

(52) U.S. Cl.
  CPC .......... *B60T 13/686* (2013.01); *B60T 2270/14* (2013.01); *B60T 2270/82* (2013.01)

(58) Field of Classification Search
  USPC ...................................... 701/1, 70, 78, 81, 83
  See application file for complete search history.

(56) References Cited

U.S. PATENT DOCUMENTS

| | | | | |
|---|---|---|---|---|
| 6,499,812 | B1* | 12/2002 | Gronau | B60T 8/405 303/10 |
| 8,849,536 | B2* | 9/2014 | Bohm | B60T 8/326 188/137 |
| 2004/0232764 | A1* | 11/2004 | Schafiyha | B60T 8/175 303/139 |
| 2009/0055067 | A1* | 2/2009 | Grell | B60T 7/122 701/78 |
| 2009/0210127 | A1* | 8/2009 | Crepin | B60T 8/36 701/75 |
| 2011/0010067 | A1* | 1/2011 | Rubenbauer | B60T 8/172 701/70 |
| 2011/0166762 | A1* | 7/2011 | Bunk | B60T 8/1755 701/70 |
| 2012/0306261 | A1* | 12/2012 | Leiber | B60T 13/745 303/146 |
| 2013/0035835 | A1* | 2/2013 | Hachtel | B60T 8/3265 701/70 |
| 2013/0304345 | A1* | 11/2013 | Bohm | B60T 8/326 701/70 |
| 2016/0137178 | A1* | 5/2016 | Bohm | B60T 8/326 701/70 |

FOREIGN PATENT DOCUMENTS

| | | |
|---|---|---|
| DE | 10 2012 200 705 A1 | 8/2012 |
| EP | WO 2008/025797 A1 | 3/2008 |
| EP | WO 2011/154369 A1 | 12/2011 |
| EP | WO 2012 101040 A2 | 8/2012 |

* cited by examiner

METHOD FOR CONTROLLING A BRAKING SYSTEM FOR MOTOR VEHICLES

CROSS REFERENCE TO RELATED APPLICATIONS

This application claims priority to German Patent Application Nos. 10 2012 217 752.3, filed on Sep. 28, 2012; 10 2013 216 157.3, filed on Aug. 14, 2013; and PCT/EP2013/068577, filed Sep. 9, 2013.

FIELD OF THE INVENTION

The invention relates to a method for controlling a braking system for motor vehicles, a control device, and a braking.

BACKGROUND

In motor vehicle engineering, "brake-by-wire" braking systems are becoming ever more widespread. Such braking systems often include not only a master brake cylinder which can be actuated by the vehicle driver but also an electrically controllable pressure supply device, by means of which the wheel brakes are actuated in the "brake-by-wire" operating mode, either directly or via the master brake cylinder. In order to convey a pleasant pedal sensation to the vehicle driver in the "brake-by-wire" operating mode, the braking systems usually include a brake pedal sensation simulation device which is operatively connected, for example, to the master brake cylinder. In order to actuate the braking system, a setpoint value transmitter is provided which evaluates, for example, the electrical signals of one or more sensors for sensing the driver's braking request (actuation request), in order to determine a setpoint value for controlling the pressure supply device. In these braking systems, the pressure supply device can, however, also be actuated on the basis of electronic signals without active engagement by the driver. These electronic signals can be output, for example, by an electronic stability program (ESC) or an adaptive cruise control system (ACC), with the result that the setpoint value transmitter determines a setpoint value for controlling the pressure supply device on the basis of these signals.

International Patent Application WO 2008/025797 A1 discloses a braking system in which it is proposed that the pressure medium which is required for electrically controlling the pressure applied in an intermediate space used for actuating the master brake cylinder be kept available in a pressureless state in the pressure supply device and placed under relatively high pressure when necessary, in order to be able to dispense with the buffering of hydraulic actuation energy which is costly and energetically disadvantageous. The pressure supply device is for this purpose formed by a cylinder-piston arrangement, the piston of which can be actuated by an electromechanical actuator. A method for controlling the braking system, in particular the pressure supply device, is not described.

DE 10 2011 076 675 A1 describes a method for controlling an electrohydraulic braking system for motor vehicles having an electronically controllable pressure supply device which is connected to hydraulically actuable wheel brakes. The pressure supply device includes a cylinder-piston arrangement with a hydraulic pressure chamber, the piston of which can be displaced relative to a position of rest by an electromechanical actuator. For the purpose of control, an actual pressure value and a setpoint pressure value are determined and are fed to a controller device as input variables. The cylinder-piston arrangement is controlled by the controller device in such a way that the setpoint pressure value in the hydraulic pressure chamber is adjusted by displacing the piston.

The object of the present invention is to make available a method for controlling a braking system for motor vehicles and a corresponding control device and braking system which permit a dynamic brake pressure buildup at low or medium setpoint pressure values.

This object is achieved according to the invention by means of a method, a control device and a braking system as described herein.

INTRODUCTORY DESCRIPTION OF THE INVENTION

A position of the pressure supply device is preferably understood to mean a variable which is characteristic of a position or orientation or location of the electromechanical actuator or of the piston of the pressure supply device.

The electromechanical actuator is preferably controlled by a control device which forms manipulated variables ($\omega_{act,Setp}$, $M_{act,Setp}$) for the electromechanical actuator as a function of an actual pressure value ($P_{V,Dach}$) of the pressure supply device and the predefined setpoint pressure value ($P_{V,Setp}$).

The actual pressure value ($P_{V,act}$) and an actual actuator speed value ($\omega_{act}$) are preferably acquired, a setpoint pressure value ($P_{V,Setp}$) is determined, and the setpoint pressure value ($P_{V,Setp}$) and the actual pressure value ($P_{V,\,act}$) are fed as input variables to a controller device which functions as a pressure controller and a speed controller which is connected downstream of the pressure controller, wherein the pressure controller outputs a setpoint actuator speed value ($\omega_{act,Setp,DR,Ctrl}$) and, a setpoint actuator speed value ($\omega_{act,\,Setp}$) and the actual actuator speed value ($\omega_{act}$) are fed as input variables to the speed controller.

It is also preferred that the pressure controller outputs a first setpoint actuator speed value ($\omega_{act,Setp,DR,Ctrl}$), a second setpoint actuator speed value ($\omega_{act,Setp,DR,FFW}$) is determined from the setpoint pressure value ($P_{V,Setp}$), and the setpoint input actuator speed value ($\omega_{act,Setp}$) for the speed controller is determined on the basis of the first and the second setpoint actuator speed values ($\omega_{act,Setp,DR,Ctrl}$, $\omega_{act,Setp,DR,FFW}$).

The first and the second setpoint actuator speed or actuator rotational speed values ($\omega_{act,Setp,DR,Ctrl}$, $\omega_{act,Setp,DR,FFW}$) are added to form a signal ($\omega_{act,Setp}$). Possible weighting are performed in the function blocks which generate these signals.

The method according to the invention is advantageously carried out in a braking system for vehicles which can be controlled in what is referred to as a "brake-by-wire" operating mode, either by the vehicle driver or independently of the vehicle driver, is preferably operated in the "brake-by-wire" operating mode, and can be operated in at least one fallback operating mode in which only the operation by the vehicle driver is possible.

The wheel brake or the wheel brakes is/are preferably hydraulically connected to the pressure chamber of the pressure supply device. Pressure medium volume expelled from the pressure chamber is therefore displaced directly into the wheel brake or brakes. Arranged between one, in particular each, wheel brake and the pressure chamber there is preferably at least one electrically controllable inlet valve with which the wheel brake can be hydraulically disconnected from the pressure chamber.

The, in particular each, wheel brake can preferably be connected to a brake fluid reservoir container, for example, via an electrically controllable outlet valve.

It is also preferred that the hydraulic pressure chamber of cylinder-piston arrangement be connected or be capable of being connected to a brake fluid reservoir container.

The invention also relates to a control device and to a braking system for motor vehicles.

An advantage of the invention is the improved (more rapid) adjustment of a predefined, in particular low or medium, setpoint pressure value in the pressure supply device and therefore in the wheel brake or brakes. A further advantage of the invention is the fact that large brake lining clearances of the wheel brake or brakes are taken into account better.

Further preferred embodiments of the invention can be found in the dependent claims and the following description on the basis of figures.

FURTHER DESCRIPTION OF THE INVENTION

The method according to the invention preferably relates to a control concept for the improved (more rapid) adjustment of predefined setpoint pressures by means of a piston which is driven by an electric motor in an active, externally actuated braking system. In particular, the improvement in the pressure buildup dynamics in the case of relatively low and medium pressure requirements is considered here. A development which is also presented deals with particularly taking into account large brake lining clearances when improving the pressure buildup dynamics.

Figure 1:
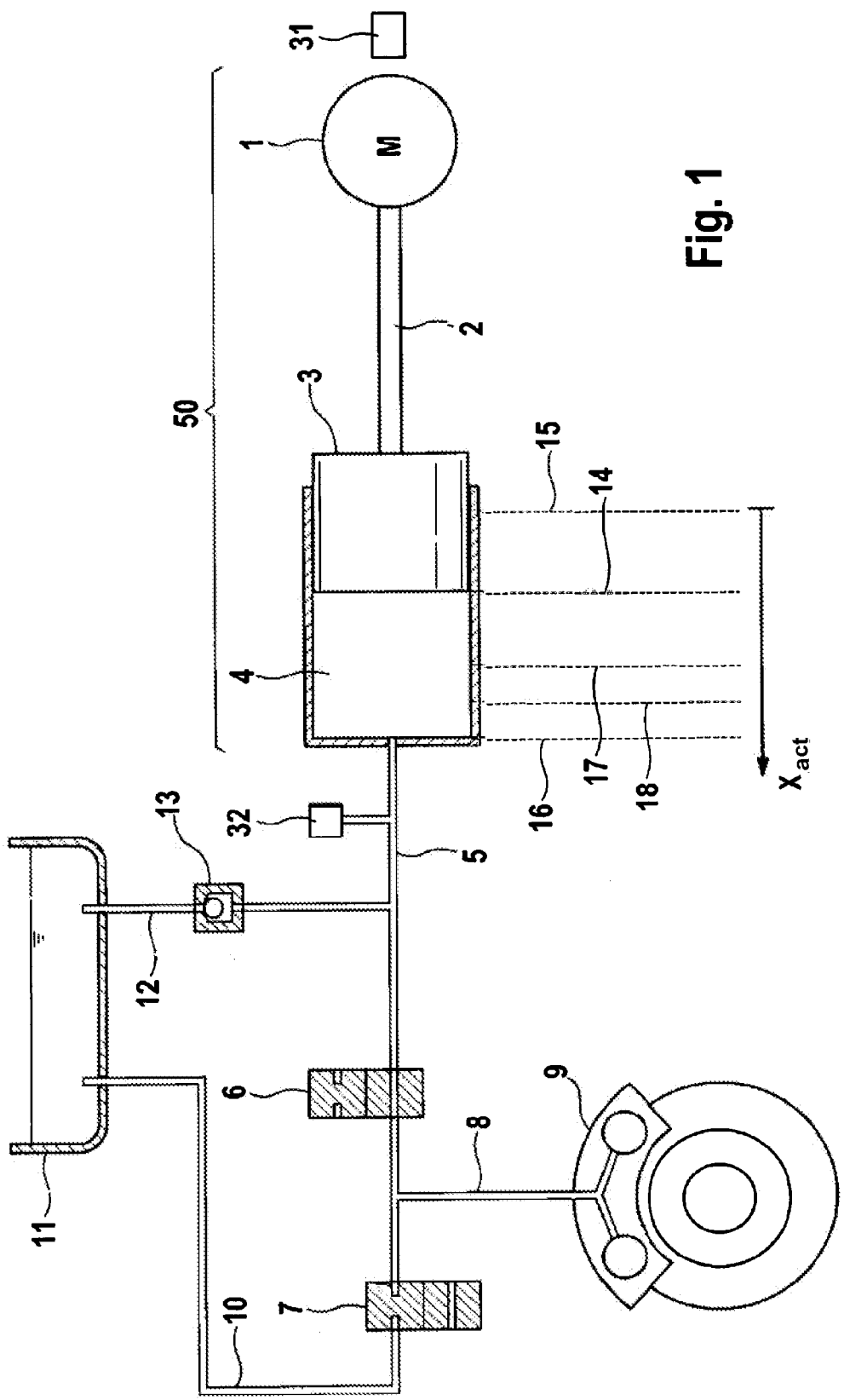
FIG. 1 shows a basic circuit diagram of an exemplary braking system for carrying out a method according to the invention.

FIG. 1 shows the simplified principle of an active braking system for a controlled wheel of a hydraulically braked vehicle. The method according to the invention is preferably carried out in an active, externally actuable braking system in which the driver makes a pressure request, for example by means of brake pedal travel, and said pressure request is implemented electronically using a pressure supply device 50, for example including an electric motor or actuator 1, a suitable gear mechanism 2 and a piston 3 which bounds a hydraulic pressure chamber 4, in that the piston 3 moves by a travel $X_{act}$ from a position of rest 15 into a position 14, with the result that a specific volume of the brake fluid is displaced from the pressure chamber 4 via the line 5 and an initially opened inlet valve 6 into the brake line 8, and therefore into the wheel brake 9. Therefore, after the brake lining clearance has been overcome a brake pressure is generated in the wheel brake 9. A braking pressure reduction can occur in that the piston 3 is moved back again in the direction of the position of rest 15. However, a rapid braking pressure reduction such as is required, for example, in the case of ABS control, is also possible by means of the valve combination 6, 7 in that the inlet valve 6 is closed and the outlet valve 7 is opened for a specific time. Brake fluid then flows out of the wheel brake 9 via the line 8 through the outlet valve 7 and therefore via the line 10 in the brake fluid container 11. This measure for reducing pressure is appropriate, in particular, when the pressure chamber 4 serves a plurality of wheel brakes in parallel.

Furthermore, for example a measuring device 31 is provided by means of which a position of the pressure supply device 50, which is characteristic of a position or orientation or location of the actuator 1 and therefore the piston 3 of the pressure supply device 30, is detected. The measuring device 31 can detect, for example, a rotor orientation angle of the electric motor 1 or a spindle position of a rotation-translation gear mechanism or else the travel $X_{A\,act}$ of the piston 3 from its position of rest 15. Alternatively, the position of the pressure supply device 50 can also be determined from other variables, for example on the basis of a model.

Furthermore, for example a pressure measuring device 32 is provided by means of which the actual pressure $P_{V,act}$, i.e. the pressure in the pressure chamber 4 of the pressure supply device 50, is measured.

For reasons of safety and of rapid detection of faults, the measurement variable $X_{act}$ and/or the actual pressure measurement variable $P_{V,act}$ are/is advantageously determined redundantly. For this purpose, the corresponding measuring device 31, 32 can be of intrinsically safe design or two redundant measuring devices can be correspondingly provided.

Basically, the braking system which is illustrated in FIG. 1 can be extended with any desired number of wheel brakes 9 in that a plurality of lines 5 are led to the wheel circuits, wherein each wheel circuit preferably has an individual valve pair 6, 7.

In order to form multiple circuits of the system for safety reasons, a plurality of pistons 3 and a plurality of pressure chambers 4 can be provided. For a passenger car a dual circuit is appropriate, wherein in each case two wheel brakes are connected to one of two pressure chambers.

Numerous improvements and different embodiments of the principle, for example in terms of the selection of the valves, are conceivable compared to the simplified illustration of the system in FIG. 1. For example a master brake cylinder can also be arranged between the hydraulic pressure chamber 4 and the wheel brake or brakes 9, with the result that the pressure generated in the pressure chamber 4 is fed to a hydraulic intermediate space, for example in an actuation device, as a result of which the master brake cylinder is actuated.

The invention is concerned with the object of setting suitable pressures in the pressure chamber 4.

The need to set a predefined pressure or pressure profile using a control method arises whenever the driver requests a general braking pressure for all the wheels of the motor vehicle by means of actuation of the brake pedal or if this pressure request is made by means of an assistance function ACC (adaptive cruise control), HSA (hill start assist), HDC (hill descent control) etc., or if a special wheel-specific brake control function becomes active, such as, for example, ABS (anti-lock braking system), TCS (traction control system) or ESP (electronic stability program).

In all cases the pressure of the pressure chamber 4 is to be advantageously set in such way that the wheel with the highest braking pressure request can be reliably supplied with the necessary pressure. With respect to the dynamics of the pressure or pressure profile to be set, within the scope of the available dynamics of the actuator 1 the shortest possible time delay between the pressure request being made and the pressure which is set in the admission pressure chamber 4 is to be aimed for. This applies, in particular, even if the actuator 1 is located in its position of rest 15 at the start of the pressure request and therefore must firstly overcome the brake lining clearance in order to set the requested pressure. In this context, the actuator firstly forces a volume, dependent on the size of the wheel brakes 9 being used and of the set brake lining clearance, out of the pressure chamber 4 into the wheel brakes, in order to apply the brake linings, for example to the brake disk. However, during this process, braking pressure is not yet built up in the wheel brakes 9. In particular by taking into account the request for a response behavior which is as good as possible, the request to implement a pressure buildup which is as rapid as possible within the scope of the available actuator dynamics, even in the case of low pressure requests, also occurs here (independently of the size of the clearance which has been set).

With respect to the control behavior for setting the requested admission pressure this means that for the pressure control it is necessary to provide measures so that the time between the making of a pressure request and the start of the pressure buildup in the wheel brakes under consideration is as short as possible. This applies, in particular, to rapid pressure buildup requests to a low to medium pressure level. When a linear controller approach is used it may be the case that the full available dynamics of the linear actuator are not utilized in this setpoint pressure range.

Figure 2:
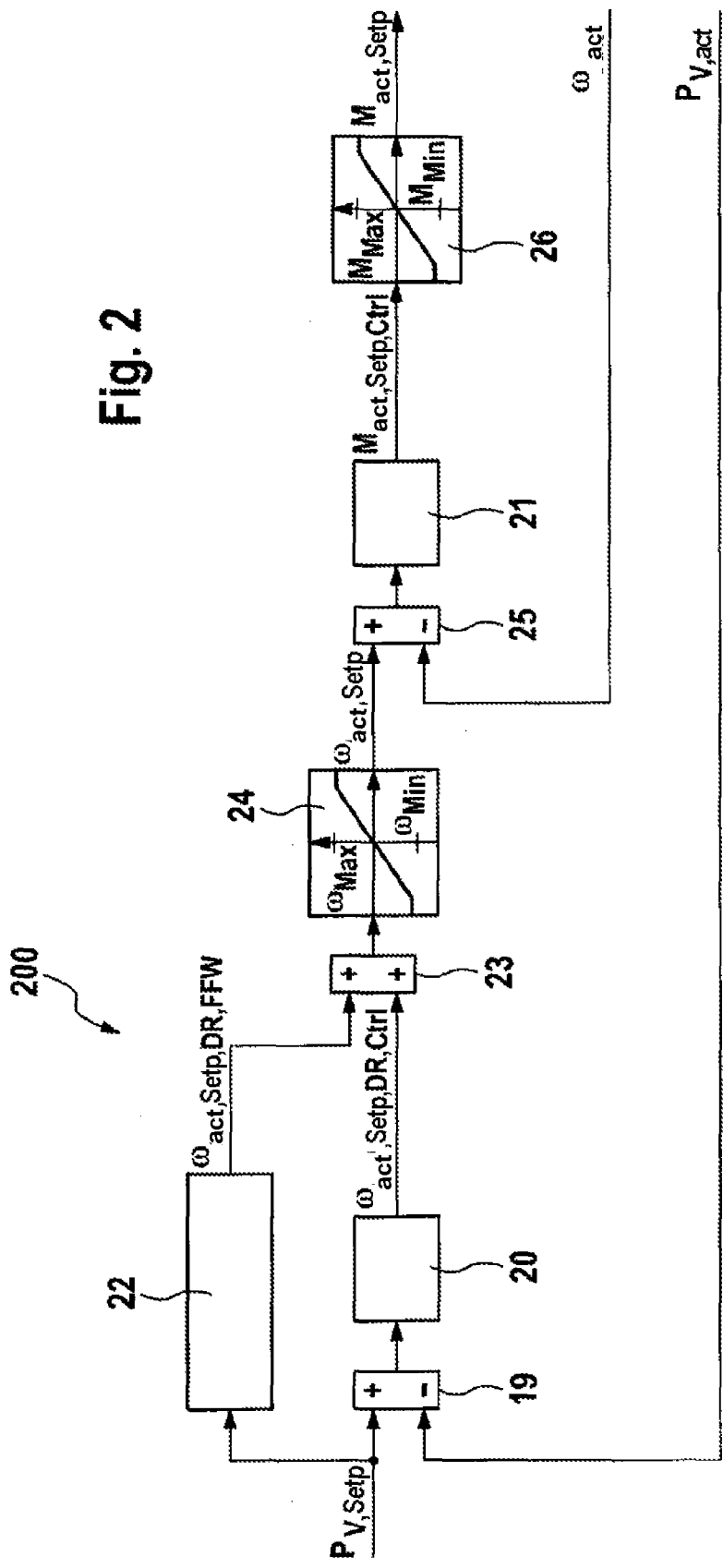
FIG. 2 shows a control device for carrying out a method for controlling a braking system.

A basic structure of a control device 200 for setting a requested pressure or pressure profile is shown in FIG. 2. It shows a pressure controller 20, to which an actuator speed controller (advantageously engine rotational speed controller) 21 is subordinated through the intermediate connection of further circuit elements (23-25). In this context, the result $\Delta P_v$ of a subtraction, carried out in a subtraction element 19, of the requested setpoint pressure value $P_{V,Setp}$ from the actual pressure value $P_{V,act}$ which is currently present, is fed to the pressure controller 20. The output variable of the pressure controller 20 is the setpoint value for the actuator rotational speed $\omega_{act,Setp,DR,Crl}$, which is transferred to the rotational speed controller 21 as an input variable while taking into account predefined minimum and maximum actuator rotational speed values $\omega_{Min}$, $\omega_{Max}$. The setpoint pressure value $P_{V,Setp}$ occurs on the basis of the requests described in the preceding sections. The actual pressure value $P_{V,act}$ is preferably measured by means of a pressure sensor (32 in FIG. 1). This pressure sensor 32 senses the pressure at the outlet of the pressure chamber 4. It is to be noted here that, in particular, the dynamic pressures which occur at the valves located between the pressure chamber 4 and the wheel brakes 9 (for example 6), which occur in the case of rapid pressure buildups, are also measured as a result.

A proportionally active controller (P controller) is usually sufficient as controller transmission behavior. In order to increase the pressure controller dynamics, for example a speed pilot control 22 is provided. The latter determines from the requested setpoint pressure value $P_{V,Setp}$ by differentiation (over time) a setpoint pressure speed which superimposes an additional component $\omega_{act,Setp,DR,FFW}$ ($\omega_{act,Setp,DR,FFW} = K_p * dP_{V,Setp}/dt$), the setpoint actuator rotational speed of the pressure controller 20 $\omega_{act,Setp,DR,Ctrl}$, weighted with a gain factor ($K_p$). The two setpoint rotational speed components are added together in an adder element 23 and fed to a limiting function 24 for limiting to the minimum or maximum permissible setpoint rotational speed ($\omega_{Min}$, $\omega_{Max}$). The output variable of the pressure controller 20, 24 is the setpoint value for the motor rotational speed $\omega_{act,Setp}$, which is transferred as an input variable to the rotation speed controller 21, 25.

The limited setpoint actuator rotational speed value $\omega_{act,Setp}$ is compared with the actual actuator rotational speed value $\omega_{act}$ in a further subtraction element 25 in order to form a setpoint actuator rotational speed value difference $\Delta\omega_{Setp}$. The setpoint actuator rotational speed value difference $\Delta\omega_{Setp}$ is fed as an input variable to the abovementioned rotational speed controller 21, the output variable of which corresponds to a setpoint value $M_{act,Setp,Ctrl}$ of the torque which is to be applied by the actuator. The setpoint torque value $M_{act,Setp,Ctrl}$ is finally limited to the minimum or maximum permissible torque value $M_{min}$, $M_{max}$ in a second limiting module 26, and provides the setpoint torque value $M_{act,Setp}$ for the electric motor. A further input variable for the rotational speed controller which usually has proportional-integrating (PI) behavior is the actual rotational speed $\omega_{act}$ of the actuator, which is preferably acquired from the actuator position $X_{act}$ (measuring device 31 in FIG. 1) which is available by means of measuring equipment for commutation purposes, for example.

The abovementioned dynamic pressures act in a disruptive fashion on the pressure control and, in order to avoid vibrations, result in a somewhat cautious adjustment of the pressure controller. As long as no limiting function is active for the pressure controller, it is operated in its linear range, which has the result that small control errors also give rise to only small setpoint rotational speeds. In both cases, the full available dynamics of the linear actuator 50 are therefore not used, in particular, for rapid pressure buildup requests from the unactuated state to a low present to medium pressure level.

Figure 3:
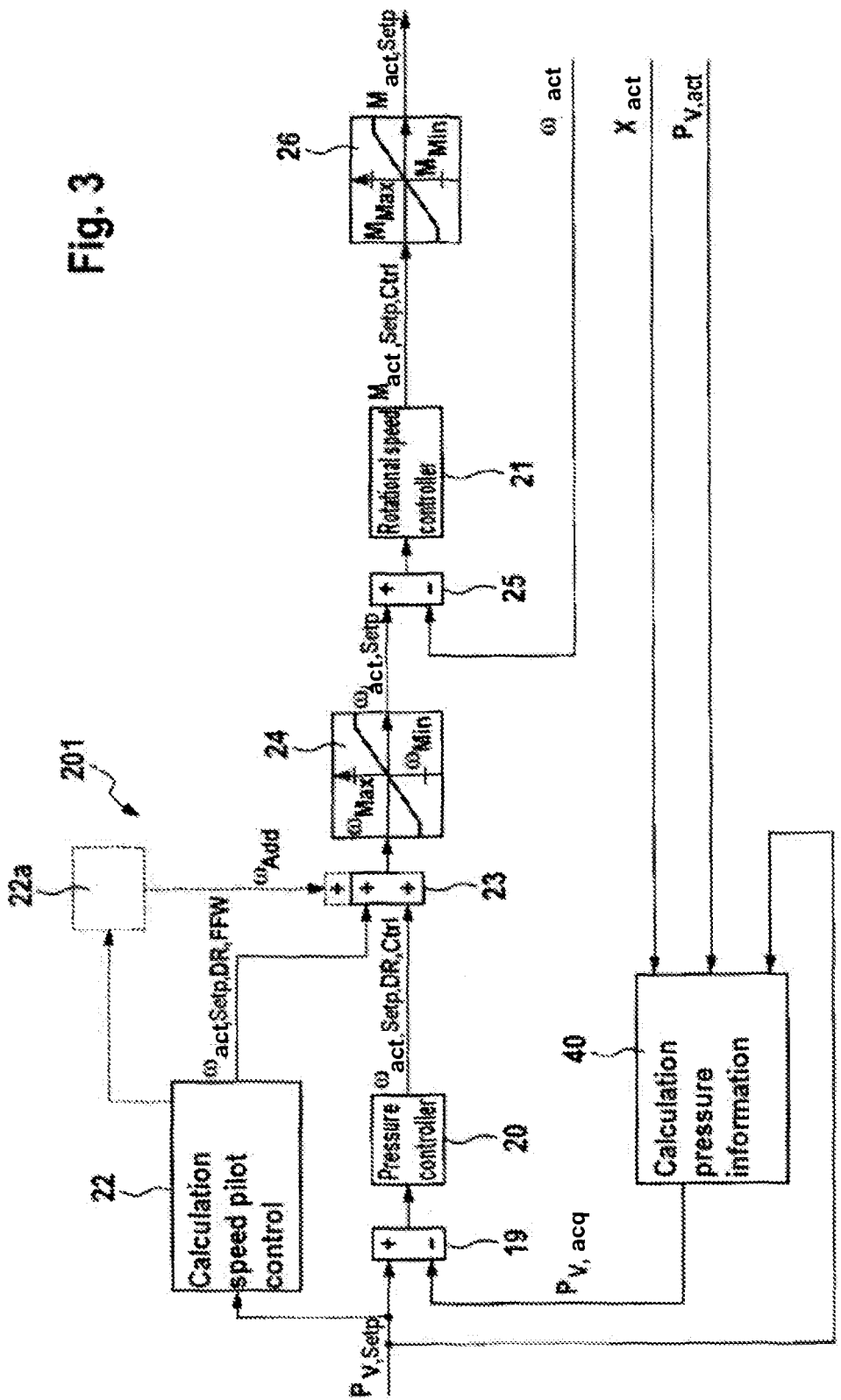
FIG. 3 shows an exemplary control device for carrying out a method according to the invention.

FIG. 3 illustrates an exemplary control device 201 for carrying out a method according to the invention which overcomes the abovementioned disadvantages and significantly improves the control behavior.

For example, the actual pressure $P_{V,act}$ which is sensed by a sensor is not basically considered as an actual pressure value for the pressure control but instead an acquired value $P_{V,acq}$ is used. For example, the actual pressure value.

$P_{V,acq}$ in the module is determined for the calculation of the pressure information (block 40).

For example the following relationship applies to the pressure signal $P_{V,acq}$.

$$P_{V,acq} = (1-\lambda) * P_{V,act} + \lambda * P_{V,Model} \qquad (1)$$

The actual pressure value $P_{V,acq}$ is obtained from an addition, weighted by the factor $\lambda$ ($\lambda = 0, \ldots, 1$), of the two pressure signals $P_{V,act}$ and $P_{V,Model}$, wherein one signal represents the already mentioned measured pressure signal $P_{V,act}$. The second signal $P_{V,Model}$ is a calculated model pressure which is obtained on the basis of the measured travel $X_{act}$, wherein a static characteristic curve or function ($f(X_{act})$), which represents the dependence, characterizing the braking system, of the actual pressure ($P_{V,act}$) on the position ($X_{act}$) of the pressure supply device 50, is calculated as a model. By means of the weighting factor $\lambda$ it is determined which signal component (in the form of the actual pressure value $P_{V,Dach}$) is fed with which intensity to the pressure control.

For example, the (predefined) characteristic curve $P_{V,Model}=f(X_{act})$ is equal to zero to a predefined position limiting value $X_0$ (i.e. for $X_{act} \leq X_0$, $P_{V,Model}=0$) and then increases as $X_{act}$ becomes larger.

The weighting factor $\lambda$ is acquired as a function of the requested setpoint pressure $P_{V,Setp}$ and advantageously additionally as a function of the requested setpoint pressure gradient $dP_{V,Setp}/dt$, which is obtained by means of the time derivative of the setpoint pressure $P_{V,Setp}$.

In the text which follows, an exemplary embodiment of the method according to the invention is described, in particular an exemplary determination of a weighting factor $\lambda$.

If the setpoint pressure $P_{V,Setp}$ is higher than a first predefined pressure value $P_2 (P_{V,Setp}>P_2)$, control is always carried out with the actual pressure $P_{V,act}$ sensor signal, i.e. the weighting factor $\lambda$ is zero, $\lambda=0$, and $P_{V,acq}=P_{V,act}$.

If the setpoint pressure $P_{V,Setp}$ is equal to or lower than the first predefined pressure value $P_2 (P_{V,Setp} \leq P_2)$, the requested setpoint pressure profile $dP_{V,Setp}/dt$ is additionally considered.

If the setpoint pressure profile $dP_{V,Setp}/dt$ exceeds a predefined second threshold $S_2$, $dP_{V,Setp}/dt > S_2$, therefore applies so that $\lambda$ becomes=1 and the pressure control forms the control error by means of the abovementioned model variable $P_{V,Model}$.

In order to avoid undesired sharp transitions from $P_{V,Act}$ to $P_{V,Model}$ (or the other way around), intermediate values are also predefined for the factor $\lambda$.

Figure 4:
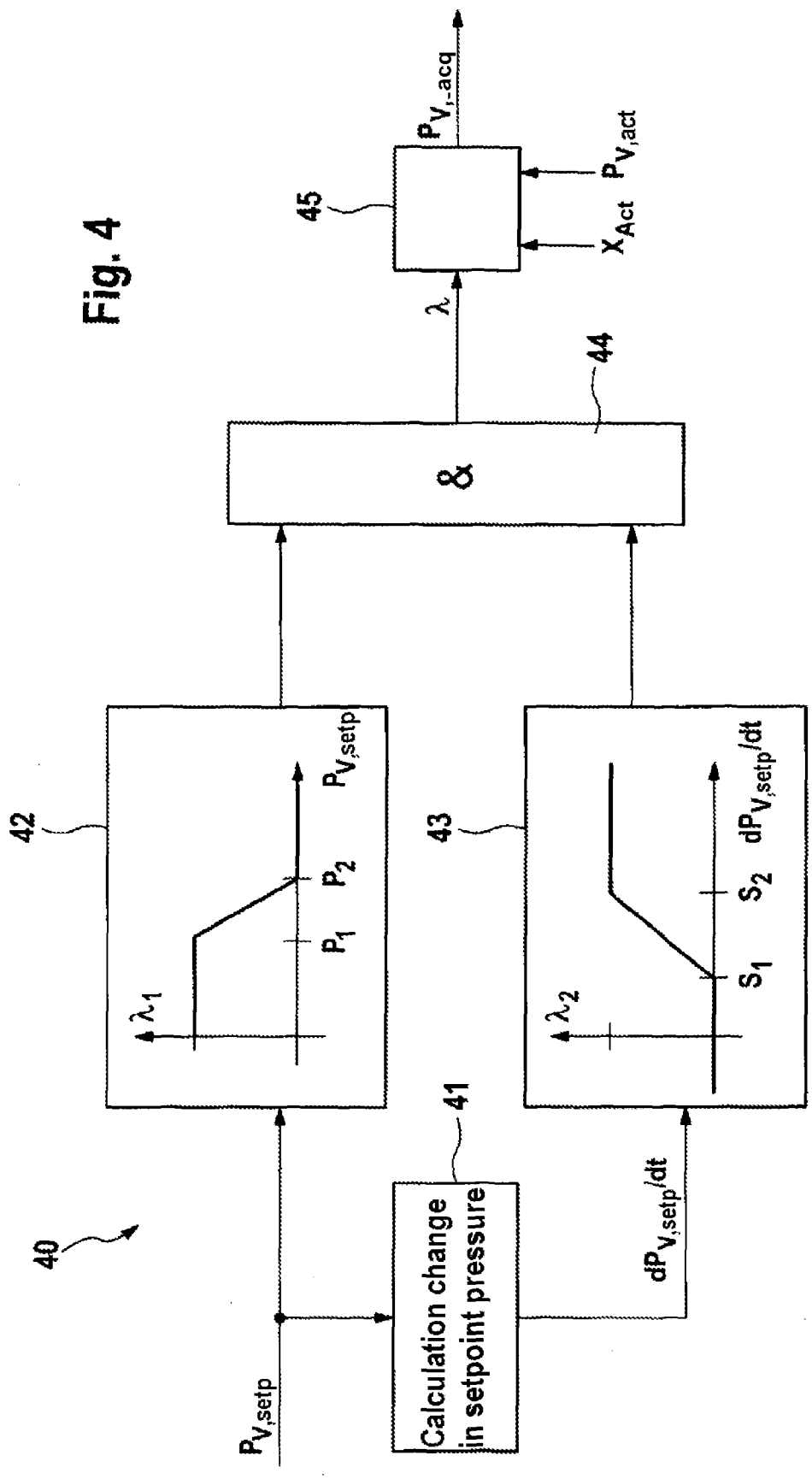
FIG. 4 shows an exemplary embodiment of the method according to the invention.

Precise details on the exemplary embodiment for determining the weighting factor $\lambda$, as it can be implemented in the module 40, is illustrated in FIG. 4. Here, a first parameter $\lambda_1$ is determined in block 42 on the basis of a predefined characteristic curve as a function of the setpoint pressure $P_{V,Setp}$. In block 43, a second parameter $\lambda_2$ is determined on the basis of a further predefined characteristic curve as a function of the setpoint pressure derivative $dP_{V,Setp}/dt$. The weighting factor $\lambda$ is determined in block 44 as a product of the two parameters $\lambda_1$ and $\lambda_2$ ($\lambda=\lambda_1 * \lambda_2$). In block 45, the actual pressure value $P_{V,acq}$ is calculated on the basis of the weighting factor $\lambda$ and the relationship in equation (1).

If the setpoint pressure $P_{V,Setp}$ is higher than a first predefined pressure value $P_2$ ($P_{V,Setp}>P_2$), $\lambda_1=0$ applies, and therefore $\lambda=0$ (independently of $\lambda_2$). If the setpoint pressure $P_{V,Setp}$ is equal to or lower than a second predefined pressure value $P_1$, $\lambda_1=1$ applies. For setpoint pressure values $P_{V,Setp}$ between the pressure values $P_1$ and $P_2$, $\lambda_1$ decreases, for example, linearly with $P_{V,Setp}$. If the setpoint pressure profile $dP_{V,Setp}/dt$ undershoots a predefined first threshold $S_1$ (i.e. only a slow pressure buildup is requested), $\lambda_2=0$ applies, and therefore $\lambda=0$, i.e. control is carried out with the actual pressure $P_{V,act}$ sensor signal. If the setpoint pressure profile $dP_V/_{Setp}/dt$ exceeds a predefined second threshold $S_2$ (i.e. a very rapid pressure buildup is requested), $\lambda_2=1$ applies. For small setpoint pressures $P_{V,Setp}$ (i.e. $P_{V,Setp}<P_1$), $\lambda=1$ (maximum value) then applies, i.e. control is carried out with the model signal $P_{V,Model}$ with the result that measured actual pressures $P_{V,Act}$ which are influenced by dynamic effects (are too large) do not influence the pressure control. In order to avoid undesired sharp transitions during the acquisition of the weighting factor $\lambda$, intermediate values for the parameters $\lambda_1$ and $\lambda_2$ and therefore for the factor $\lambda$ are acquired in the range between $P_1$ and $P_2$ (for $P_{V,Setp}$) or between $S_1$ and $S_2$ (for $P_{V,Setp}/dt$).

Figure 5:
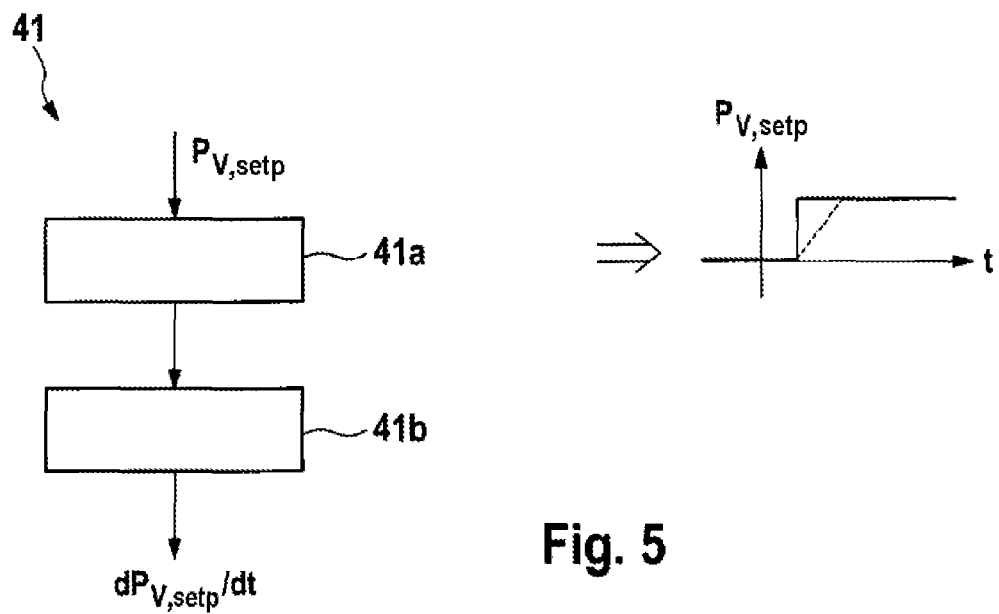
FIG. 5 shows an exemplary embodiment of the method according to the invention.

The pressure value $P_2$ can be, for example, several 10s of bar. The threshold $S_2$ can be, for example, in the range of 1 or several 100s of bar/sec. The requested setpoint pressure profile $dP_{V,Setp}/dt$ is determined in Block 41. An exemplary method for determining $dP_{V,Setp}/dt$ is illustrated in FIG. 5. The requested setpoint pressure profile $dP_{V,Setp}/dt$ is preferably acquired using a differentiating filter (block 41b), wherein a rise limiting function (optional block 41a) is advantageously additionally introduced, with the result that step-shaped changes to the pressure request $P_{V,Setp}$ result in a finite setpoint pressure gradient $dP_{v,Setp}/dt$. In block 41a a step-shaped pressure request $P_{V,Setp}$ (continuous line in the right-hand diagram $P_{V,Setp}$ as a function of the time t) is converted into a pressure request $P_{V,Setp}$ with, for example, a linear rise (dashed line in the right-hand diagram $P_{V,Setp}$ as a function of the time t).

As a result of the described measures, in the case of slow pressure requests the pressure control always operates with the measured pressure sensor signal, while in the case of rapid pressure requests it is initially controlled up to a certain pressure level using the model signal, and the sensor signal is only used to adjust the static target pressure, as a result of which the steady-state accuracy of the pressure control is achieved again.

The transition of the pressure control signal $P_{V,acq}$ from the model signal $P_{V,Model}$ to the measured pressure value $P_{V,act}$ is defined by the weighting factor $\lambda$, which is acquired, for example, in accordance with the arrangement illustrated in FIG. 4. As a result, in particular the influence of the dynamic pressures mentioned at the beginning, which influence acts in a disruptive way on the pressure control, is minimized, which gives rise to an increase in the pressure buildup dynamics. Furthermore, owing to this the parameterization of the pressure controller can be performed significantly more strongly with respect to improved control behavior.

Figure 6:
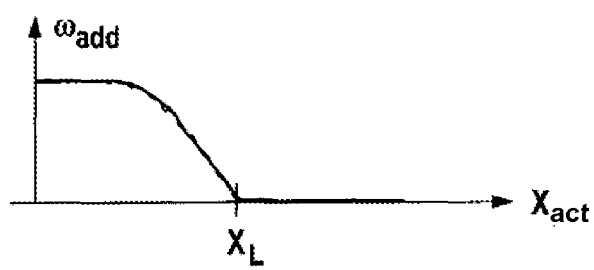
FIG. 6 shows an exemplary embodiment of the method according to the invention.

For improved response behavior, in particular when wheel brakes with an increased brake lining clearance are used, in order to overcome this clearance more quickly an additional extension of the controller structure illustrated in FIG. 2 is preferably used, which extension relates to an extension of the speed pilot control and is illustrated by dashed lines in FIG. 3 (block 22a and connections). In addition to the already mentioned pilot control rotational speed $\omega_{act, Setp,DR,FFW}$, which is obtained on the basis of the setpoint pressure gradient (block 22), an additional engine rotational speed component $\omega_{add}$ is provided, for example, as a pilot control variable (block 22a) which depends, for example, on the size of the clearance ($X_L$) to be overcome. This additional engine rotational speed component $\omega_{add}$ is superimposed additively in the case of a requested pressure buildup of the pilot control rotational speed $\omega_{act, Setp,DR,FFW}$, as long as the clearance ($X_L$) has not yet been overcome. An exemplary characteristic curve of the engine rotational speed component $\omega_{add}$ as a function of the currently measured actuator travel $X_{act}$ is illustrated in FIG. 6. The limiting value $X_L$ advantageously corresponds to the value of the position limiting value $X_0$ of the model used as a basis (see the characteristic curve $P_{V,Model}=f(X_{act})$ above). The size of the additional rotational speed component $\omega_{add}$ can also be predefined (additionally) as a function of the requested setpoint pressure gradient $dP_{V,Setp}/dt$.

While the above description constitutes the preferred embodiment of the present invention, it will be appreciated that the invention is susceptible to modification, variation and change without departing from the proper scope and fair meaning of the accompanying claims.

The invention claimed is:

1. A method for controlling a braking system for motor vehicles, the method comprising the steps of:
providing a hydraulically actuable wheel brake which can be actuated by means of an electronically controllable pressure supply device having a cylinder-piston arrangement with a hydraulic pressure chamber, and a piston which is configured to be displaced by an electromechanical actuator, with the result that a predefined setpoint pressure value ($P_{V,Setp}$) in the hydraulic pressure chamber can be adjusted,
detecting a position ($X_{act}$) of the pressure supply device,
determining an actual pressure ($P_{V,\,act}$) of the pressure supply device by a measuring device,
forming manipulated variables ($\omega_{act,Setp}$, $M_{act,Setp}$) for an electromechanical actuator formed on the basis of the predefined setpoint pressure value ($P_{V,Setp}$) and an acquired pressure value ($P_{V,\,acq}$), and
determining the acquired pressure value ($P_{V,\,acq}$) as a function of the setpoint pressure value ($P_{V,Setp}$) by weighted addition of the actual pressure ($P_{V,\,act}$) and of a model pressure ($P_{V,Mod}$) calculated from a the position ($X_{act}$) of the pressure supply device.

2. The method as claimed in claim 1, further comprising the step of determining or selecting the acquired pressure value ($P_{V,\,acq}$) as a function of the time derivative of the predefined setpoint pressure value ($dP_{V,Setp}/dt$).

3. The method as claimed in claim 1 further comprising the step of determining a weighting factor ($\lambda$) for the weighted addition as a function of the setpoint pressure value ($P_{V,Setp}$).

4. The method as claimed in claim 3, further comprising the step of determining the weighting factor ($\lambda$) for the weighted addition as a function of the time derivative of the predefined setpoint pressure value ($dP_{V,Setp}/dt$).

5. The method as claimed in claim 1 further comprising the step of determining the acquired pressure value ($P_{V,\,acq}$) is equal to the actual pressure ($P_{V,act}$) if the setpoint pressure value ($P_{V,Setp}$) is above a predefined pressure threshold value ($P_2$).

6. The method as claimed in claim 2 further comprising the step of comparing the time derivative of the predefined setpoint pressure value ($dP_{V,Setp}/dt$) with a predefined threshold value ($S_1$, $S_2$) if the setpoint pressure value ($P_{V,Setp}$) is below the predefined pressure threshold value ($P_2$).

7. The method as claimed in claim 6 further comprising the step of determining the acquired pressure value ($P_{V,\,acq}$) is equal to the model pressure ($P_{V,Mod}$) if the time derivative of the predefined setpoint pressure value ($dP_{V,Setp}/dt$) is above the predefined threshold value ($S_2$) and if the setpoint pressure value ($P_{V,Setp}$) is below a predefined pressure threshold value ($P_1$).

8. The method as claimed in claim 1 further comprising the step of calculating the model pressure ($P_{V,Mod}$) according to a predefined characteristic curve or function ($f(X_{act})$) which represents the dependence, characterizing the braking system, of the actual pressure ($P_{V,\,act}$) on the position ($X_{act}$) of the pressure supply device.

9. The method as claimed in claim 1 further comprising the step of feeding the setpoint pressure value ($P_{V,Setp}$) and the acquired pressure value ($P_{V,\,acq}$) to a pressure controller with a speed controller connected downstream, wherein a speed pilot controller is provided, the output variable ($\omega_{add}$) of which is determined as a function of the current position ($X_{act}$) of the pressure supply device.

10. A control device for a hydraulically actuatable wheel brake, the control device comprising:
an electronically controllable pressure supply device having a cylinder-piston arrangement with a hydraulic pressure changer, the electronically controllable pressure supply device being configured to actuate the hydraulically actuatable wheel brake,
a piston of the cylinder-piston arrangement of which can be displaced by an electromechanical actuator, with the result that a predefined setpoint pressure value ($P_{v,\,Setp}$) in the hydraulic pressure chamber can be adjusted,
a detecting device configured to detect a position ($X_{act}$) of the pressure device,
a measuring device configured to determine an actual pressure ($P_{v,\,act}$) of the pressure supply device and feed the actual pressure ($P_{v,\,act}$) to a pressure controller,
the control device forming manipulated variables ($\omega_{act,Setp}$, $M_{act,Setp}$) for the electromechanical actuator as a function of an acquired pressure value ($P_{V,\,acq}$) and a predefined setpoint pressure value ($P_{V,Setp}$),
the control device comprising the pressure controller and a speed controller which is connected downstream of the pressure controller, and
wherein manipulated variable ($\omega_{act,Setp}$) which represents a setpoint actuator speed value and an actual actuator speed value ($\omega_{act}$) are fed as input variables to the speed controller, in that means are provided which determine the acquired pressure value ($P_{V,\,acq}$), and feed it to the pressure controller.

11. The control device as claimed in claim 10, further comprising:
the pressure controller is configured to output a first setpoint actuator speed value ($\omega_{act\,Setp,DR,Ctrl}$),
the pressure controller is configured to determine a second setpoint actuator speed value ($\omega_{act,Setp,DR,FFW}$) from the setpoint pressure value ($P_{V,Setp}$), the time derivative of the setpoint pressure value, and
the pressure controller is configured to determine a third setpoint actuator speed value ($\omega_{add}$) at least from the position ($X_{act}$) of the pressure supply device, and the manipulated variable ($\omega_{act,Setp}$), which represents the setpoint actuator speed value, for the speed controller is determined on the basis of the first, the second and the third setpoint actuator speed values ($\omega_{act,Setp,DR,Ctrl}$, $\omega_{act,Setp,DR,FFW}$, $\omega_{add}$).

12. A braking system for motor vehicles comprising:
at least one hydraulically actuable wheel brake
an electronically controllable pressure supply device for actuating the wheel brake,
the pressure supply device comprises a cylinder-piston arrangement with a hydraulic pressure chamber, a piston of which can be displaced by an electromechanical actuator,
a measuring device for determining an actual pressure ($P_{V,\,act}$) of the pressure supply device, having means for determining a position ($X_{act}$) of the pressure supply device and an electronic open-loop and closed-loop control unit for controlling the electromechanical actuator,
a control device, the control device configured to form manipulated variables ($\omega_{act,Setp}$, $M_{act,Setp}$) for the electromechanical actuator as a function of an acquired pressure value ($P_{V,\,acq}$) and a predefined setpoint pressure value ($P_{V,Setp}$), and the control device a pressure controller and a speed controller which is connected downstream of the pressure controller, wherein manipulated variable ($\omega_{act,Setp}$) which represents a setpoint actuator speed value and an actual actuator speed value ($\omega_{act}$) are fed as input variables to the speed controller, in that means are provided which determine the acquired pressure value ($P_{V,\,acq}$), and feed it to the pressure controller, falls below a configured low limit.

* * * * *